Sept. 6, 1966  F. G. KAMOWSKI  3,270,768

VALVE AND PRESSURE GAUGE ASSEMBLY

Filed March 7, 1963

INVENTOR
FRANK G. KAMOWSKI
BY
*Edward V. Emmons*
ATTORNEY

United States Patent Office 3,270,768
Patented Sept. 6, 1966

3,270,768
VALVE AND PRESSURE GAUGE ASSEMBLY
Frank G. Kamowski, East Orange, N.J., assignor, by mesne assignments, to The Fyr-Fyter Company, a corporation of Delaware
Filed Mar. 7, 1963, Ser. No. 263,457
3 Claims. (Cl. 137—327)

The present invention relates to the high pressure gas storage art and more particularly to a valve and pressure gauge assembly for a container of high pressure gas.

In many cases it has been found desirable to incorporate a pressure gauge with the valve for a high pressure gas container. Difficulties have been had in achieving a construction in which the valve and pressure gauge assembly is compact enough so as to be received within the standard shipping cap applied to the valve end of the high pressure gas container. Inasmuch as such high pressure gas cylinders and the shipping cap therefor have been standardized for many years it is necessary that the combined valve and pressure gauge assembly be so arranged as to fit within the shipping cap. While such combination valve and pressure gauge assemblies have been provided, a problem is presented in attaching the inlet pipe of the pressure gauge to the valve in a leakproof manner with a minimum of construction difficulties.

Heretofore a combination valve and pressure gauge assembly has been provided in which the inlet pipe of the pressure gauge has been extended through the wall of the valve with the inner end of the inlet pipe threaded to receive a ring nut type holding member with a passage therethrough. Such a construction has required the use of gaskets and has generally required space within the outlet passage for the head of the holding member.

The present invention aims to overcome the difficulties and disadvantages of prior devices by providing a valve and pressure gauge assembly which does not require gaskets nor fittings extending into the discharge passage of the valve.

In accordance with the invention this is accomplished by providing a valve and pressure gauge assembly in which the inlet pipe for the pressure gauge is provided with a tapered threaded surface and adapted to engage in a threaded opening leading through the valve body to the inlet passage thereof. The valve gauge inlet pipe is so constructed as to be screwed in position by a tool inserted through a cross passage of the valve member. Advantage is taken of the requirement for a safety plug by providing a safety plug passage in alignment with the pressure gauge inlet passage.

Another object of the invention is to provide a valve and pressure gauge assembly which is simple and economical in manufacture, efficient in operation and durable in use.

Other objects and advantages of the invention will be apparent from the following description and from the accompanying drawing which shows, by way of example, an embodiment of the invention.

Figure 1:
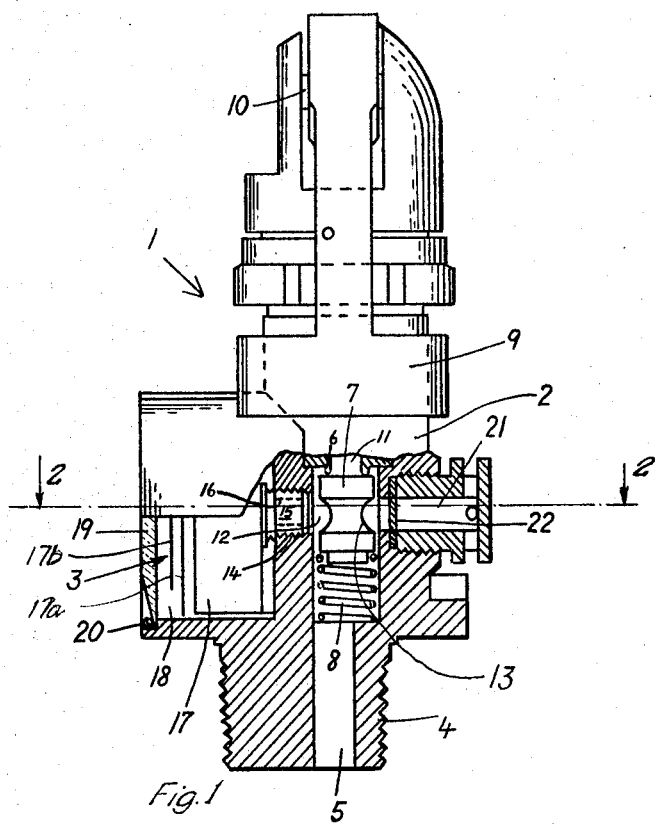
FIGURE 1 is a side view of a valve and pressure gauge assembly in accordance with the invention, the lower half of the outer surface being shown as broken away to reveal the interior construction as a vertical sectional view.

Referring to the drawing there is shown in the figures a high pressure valve 1 including a valve body 2 having assembled therewith a pressure gauge 3. The valve body 2 is formed with a threaded lower end 4 adapted to be received in the threaded neck of a conventional high pressure gas cylinder. The lower end 4 is formed with an inlet passage 5. A discharge passage extends through the valve body 2 and terminates at an outlet 5a on the rear side of the valve, shown in dashed lines on FIGURE 2. Positioned about the inlet passage 5 is a valve seat 6 against which is seated a conventional valve member 7 urged into valve closing relationship by a spring 8. The valve member 7 is unseated by use of an operating handle 9 pivoted at 10 and including a conventional operating rod 11 so that the valve member is unseated by an upward movement of the valve handle 9.

Figure 2:
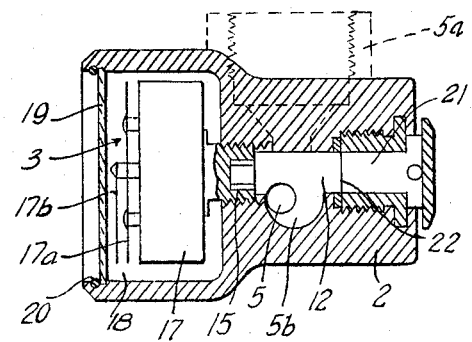
FIGURE 2 is a horizontal sectional view taken along the line 2—2 of FIGURE 1 as seen in the direction of the arrows. The outlet is shown in dashed lines as it is mainly above the line 2—2.

In accordance with the invention a cross passage 12 is provided intersecting the inlet passage 5. The inlet passage 5 is placed off center with respect to the axis of the lower end 4 of the valve body. Likewise, the passage 5 is off center with respect to its intersection with the passage 12. That is, as seen in FIGURE 2, the axis of the passage 12 is through the center of the valve body 2 while the axis of the passage 5 is off center with respect to the axis of the threaded lower end 4. The valve member 7 is placed in an enlarged portion 5b of the main inlet passage 5 and is made with a reduced portion 13 at the intersection of the passages 5 and 12. One end of the cross passage 12 is provided with a tapered thread 14 adapted to cooperate with a corresponding tapered external surface of a pressure gauge inlet pipe 15. It is preferred that the tapered threads be Briggs Standard or American National taper pipe thread one thirty-second of an inch tapered per inch per side or a total taper of one sixteenth inch per inch. Obviously other equivalent pipe tapers might alternatively be used. The inner surface of the pressure gauge inlet pipe is broached to receive a hexagonal or square or other suitable inside tool or the inner end of the inlet pipe may be slotted to receive a screwdriver. Such forming of the inlet pipe surface is indicated by the numeral 16.

The gauge 3 includes a pressure responsive means generally indicated as 17 and which might be the operating unit of a Bourdon gauge, of a diaphragm gauge, or of a closed helix gauge which, as usual, is provided with a dial 17a and a pointer 17b. As illustrated the gauge mechanism is included in a recess 18 formed in the wall of the valve body 2. A crystal 19 is secured in position by a snap ring 20. The other end of the cross passage 15 is closed by any suitable closure member although preferably the closure member may be a conventional safety plug 21 including a safety disc 22 as is well known in the art.

In the assembly of the valve and pressure gauge assembly 1, the gauge 3 may be secrewed into position either before or after the valve member 7 and the closure member which may be a combination safety disc and recoil plug 21 have been placed in position. A tool is inserted through the opening for the closure member and engaged with the tool engaging surface 16 of the pressure gauge inlet pipe 15 to screw it into the desired position. In the event the valve member 7 is in place the tool will pass through its reduced portion 13. Preferably a suitable pipe compound is applied to the threads, before the parts are screwed together. After the gauge has been placed in position the valve member 7 and closure member 21 are installed in the usual manner.

While the invention has been illustrated and described with reference to a specific embodiment thereof, it will be understood that other embodiments may be resorted to without departing from the invention. Therefore, the form of the invention set out above should be considered as illustrative and not as limiting the scope of the following claims.

I claim:
1. A valve and pressure gauge assembly comprising a valve body having a main discharge passage therethrough, means forming a cross passage intersecting said main discharge passage, means forming a pressure gauge recess in said valve body about one end of said cross passage, means forming a threaded surface in the wall of at least one end of the cross passage, a pressure gauge, a threaded inlet pipe for the pressure gauge, the pressure gauge positioned in said recess with its inlet pipe threadedly engaged in said cross passage and providing a support for the pressure gauge, means forming a tool engaging surface on the pressure gauge inlet pipe, and removable closure means for the other end of the cross passage whereby a tool may be introduced through said other end of the cross passage into contact with said tool engaging surface to turn the inlet pipe into threaded engagement with the wall of the cross passage.

2. A valve and pressure gauge assembly according to claim 1 in which the axes of the cross passage and the discharge passage are substantially at right angles and offset from each other.

3. A valve and pressure gauge assembly according to claim 2 in which a valve member is placed in the main discharge passage, said valve member having a reduced central portion for the passage of a tool to engage said tool engaging surface of said pressure gauge inlet pipe for turning the inlet pipe into threaded engagement with the wall of the cross passage.

References Cited by the Examiner

UNITED STATES PATENTS

| | | | |
|---|---|---|---|
| 867,942 | 10/1907 | Bobrick | 222—3 X |
| 2,719,532 | 10/1955 | Grant | 137—68 |
| 3,035,602 | 5/1962 | Johnson | 137—315 |

WILLIAM F. O'DEA, *Primary Examiner.*

ISADOR WEIL, *Examiner.*

R. GERARD, *Assistant Examiner.*